United States Patent [19]

Deering

[11] Patent Number: 5,173,859
[45] Date of Patent: Dec. 22, 1992

[54] AUTOMATIC VEHICLE DECELERATION

[75] Inventor: Richard K. Deering, Mt Clemens, Mich.

[73] Assignee: General Motors Corporation, Detroit, Mich.

[21] Appl. No.: 611,267

[22] Filed: Nov. 5, 1990

[51] Int. Cl.$^5$ .............................................. B60R 21/00
[52] U.S. Cl. ........................... 364/426.01; 364/424.01; 364/426.04; 180/271
[58] Field of Search ....................... 364/426.04, 424.05, 364/426.01, 424.01, 436, 461; 342/71; 180/168, 169, 167, 170, 271

[56] References Cited

U.S. PATENT DOCUMENTS

| | | | |
|---|---|---|---|
| 3,725,921 | 4/1973 | Weidman et al. | 343/7 ED |
| 3,898,652 | 8/1975 | Rashid | 342/71 X |
| 3,952,301 | 4/1976 | Sorkin | 342/71 |
| 4,621,705 | 11/1986 | Etoh | 364/426.04 X |
| 4,622,636 | 11/1986 | Tachibana | 364/424.04 |
| 4,628,317 | 12/1986 | Nishikawa et al. | 180/169 X |
| 4,706,195 | 11/1987 | Yoshino et al. | 364/426 |
| 5,053,979 | 10/1991 | Etoh | 364/424.05 X |

Primary Examiner—Kevin J. Teska
Assistant Examiner—Edward Pipala
Attorney, Agent, or Firm—Howard N. Conkey

[57] ABSTRACT

An unobtrusive vehicular adaptive speed control system controls vehicle traveling speed in response to sensed obstacles preceding the vehicle, to driver influenced control parameters, and to a desired travelling speed set by the vehicle driver.

7 Claims, 7 Drawing Sheets

AUTOMATIC VEHICLE DECELERATION

FIELD OF THE INVENTION

This invention relates to an adaptive vehicle speed control system and, more particularly, to a speed control system that senses obstacles preceding a vehicle, and adapts the speed of the vehicle in response thereto.

BACKGROUND OF THE INVENTION

Vehicle cruise control systems are popular equipment on conventional vehicles. Recently, adaptive cruise control systems have been proposed, where, in addition to conventional factors, external factors are considered in the control of vehicle speed. Known automatic systems attempt to maintain a desired speed, set by the driver, but are capable of detecting obstacles in front of the vehicle, and are capable of adapting the vehicle speed in response thereto.

Commonly, these adaptive systems adjust vehicle speed in response to detected obstacles in such a manner as to cause speed perturbations perceptible to the driver of the vehicle. These perturbations may affect driver comfort or driver confidence in the adaptive speed control system. In the end, they can affect the marketability of adaptive speed control systems.

Conventional systems also prescribe control based on presumed driver capabilities, such that all drivers alike must succumb to the deceleration rate, brake reaction time and minimum following distance allowed by the system, if any. These parameter settings may not be consistent with the driver's preferred driving style, undermining the desirability of using the adaptive speed control system.

SUMMARY OF THE INVENTION

The present invention overcomes the shortcomings of the prior systems by carefully controlling the vehicle speed at all times when obstacles are present, including during control transitions, with a primary objective of minimizing speed perturbations that may be obtrusive to the driver. Additionally, the system compensates for driver response time by allowing the driver to dial in a preferred reaction time which affects not only minimum desired inter-vehicle spacing, but also braking response time and the maximum allowable deceleration value.

In general, this system determines a desired following distance or spacing between the controlled vehicle and vehicles ahead of the controlled vehicle. This distance may be based on a driver selected "spacing input". If a vehicle detected ahead of the subject vehicle is outside the desired distance, the subject vehicle speed is controlled with respect to the preceding vehicle in a first mode, in a manner common in the art.

However, if the actual spacing is less than the desired spacing, the controller will operate in a second control mode and calculate a deceleration rate with which to decelerate the vehicle, such that as the range approaches the driver influenced minimum distance, the controlled vehicle speed will approach the speed of the preceding vehicle. Upon reaching a predetermined minimum deceleration value, the vehicle will be further carefully decelerated at that predetermined value, which may be the level road coast rate for that vehicle, allowing the inter-vehicle spacing to increase until that spacing reaches the desired spacing, at which time a conventional speed control mode is entered to maintain the vehicle at or near that desired spacing.

Unlike the prior systems, this invention provides smooth transitioning between control modes placing importance on minimizing control perturbations. The rate of deceleration is also continually controlled for accuracy and repeatability; and is set to provide a beneficial tradeoff between smoothness and fidelity. Additionally, the rate of deceleration, the braking harshness and response and the minimum possible spacing are tailored to the individual driver's driving preferences.

DESCRIPTION OF THE ILLUSTRATIONS

DESCRIPTION OF THE PREFERRED EMBODIMENT

Figure 1:
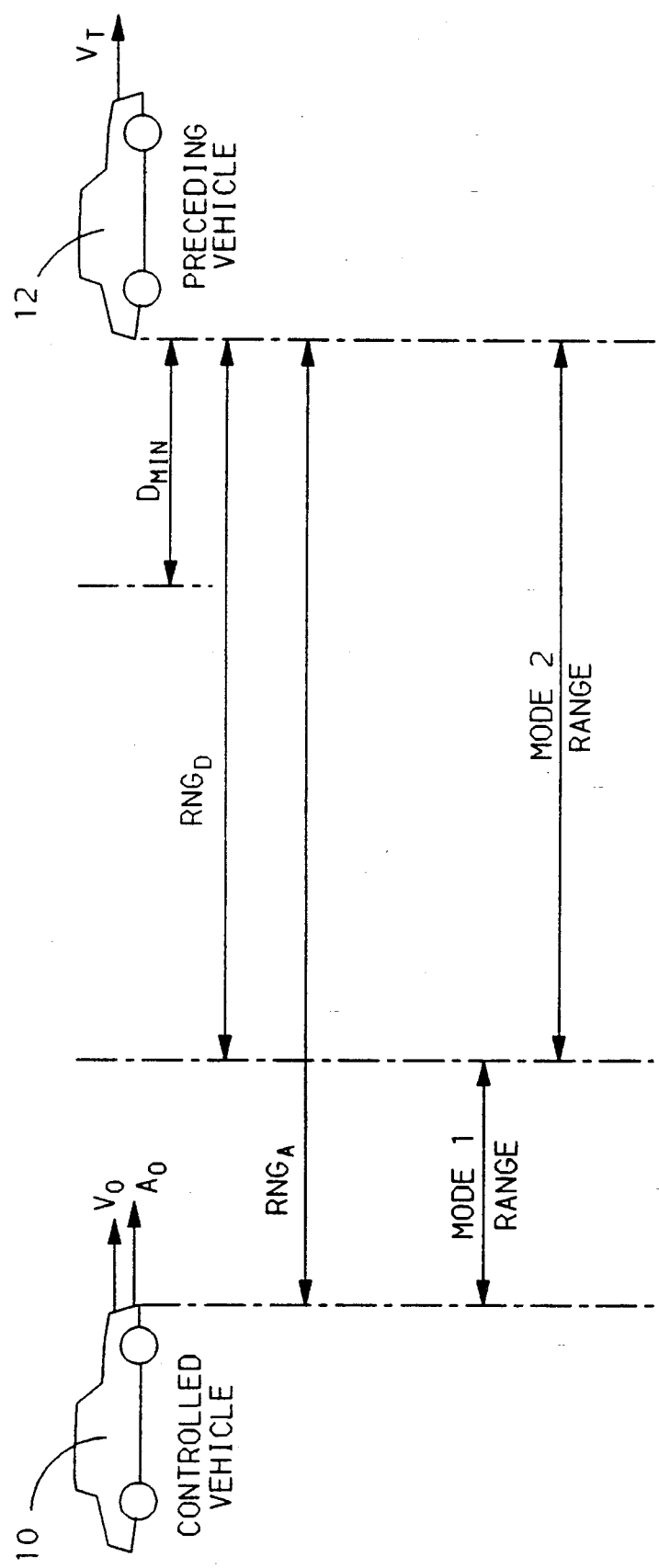
FIG. 1 is a general diagram illustrating the relationship between range and speed control moding in accord with this invention.

Referring to FIG. 1, when an automotive vehicle 10, traveling at a speed $V_o$ and at an acceleration $A_o$, and having associated with it an adaptive speed control system incorporating the principles of this invention (the controlled vehicle) detects a preceding vehicle 12 traveling at a speed $V_T$, the controlled vehicle, if its adaptive speed control system is active, immediately ascertains the speed of the vehicle, the spacing between the two vehicles (range), and the rate said range is changing (range rate).

Upon sensing the preceding vehicle 12, the control system will calculated a desired range for the two vehicles $RNG_D$. If the actual range $RNG_A$ of the two vehicles exceeds $RNG_D$, the range is classified as being within mode 1, shown in FIG. 1, and mode 1 speed control is activated. Alternatively, if $RNG_A$ is less than $RNG_D$, the range is classified as being within mode 2, also shown in FIG. 1, and mode 2 speed control is activated. In order to minimize control oscillation between mode 1 and mode 2 control, a hysteresis band is provided in a conventional manner to the transition point $RNG_D$. Accordingly, to make a transition from mode 2 to mode 1, $RNG_A$ must exceed $RNG_D$ plus the hysteresis band.

In general, mode 1 control basically controls vehicle speed in a conventional manner, such that the vehicle 10 approaches the desired range, but does not violate it, i.e. does not allow range to be less than the desired range. Mode 2 basically establishes, based on the driver's spacing input, an absolute minimum distance, shown in FIG. 1 as $D_{MIN}$, and controls vehicle deceleration $A_D$ such that as range approaches $D_{MIN}$, $V_o$ approaches $V_T$. When $A_D$, which decreases in magnitude as $V_o$ approaches $V_T$, reaches a predetermined minimum deceleration value, it is held at that value until $RNG_A$ is approximately equal to $RNG_D$. Mode 1 control then operates to control the vehicle speed.

Figure 2:
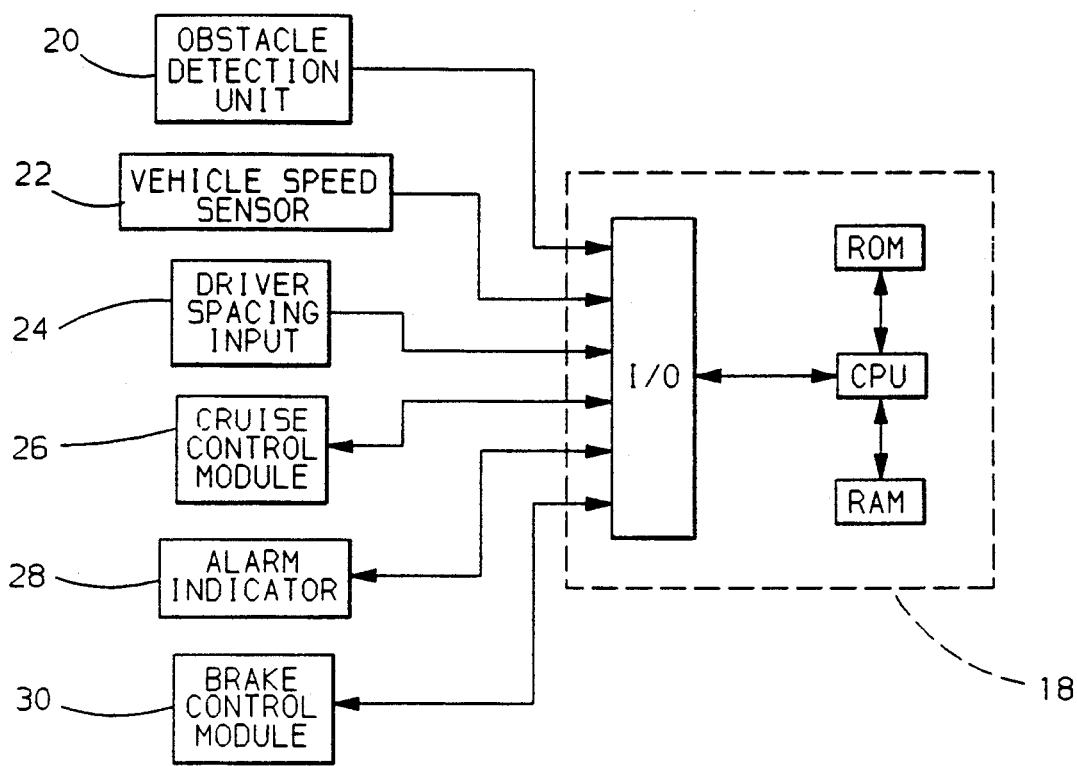
FIG. 2 is a diagram of the electronic controllers used to carry out the principles of this invention in accord with this embodiment.

Referring to FIG. 2, a conventional obstacle detection unit 20, such as a common radar system, is mounted in a forward position on the controlled vehicle 10, such that it is capable of detecting forward obstacles, especially vehicles in the path preceding the controlled vehicle. Information from the detection system 20 is transmitted to an adaptive speed controller 18, such that, if a preceding vehicle is present, the controller is provided with the traveling speed of that vehicle $V_T$, the range or inter-vehicle spacing $RNG_A$, and the range rate, or the rate that the inter-vehicle spacing is changing.

A conventional vehicle speed sensor 22 transmits the traveling speed of the controlled vehicle $V_o$ to the controller 18. The controller may use this information to calculate the acceleration of the controlled vehicle $A_o$.

A driver "spacing input" 24 is provided, such as by a dial located in proximity to the vehicle instrument panel, whereby the driver may influence the speed control system according to his desired driving style. The spacing input set by the driver in this manner affects the desired inter-vehicle spacing $RNG_D$, the minimum allowable spacing $D_{MIN}$, the maximum tolerable vehicle deceleration value, and the vehicle braking reaction time $T_{RB}$. The manner in which these parameters are affected will be described shortly.

In general, the adaptive speed controller 18, in carrying out the principles of this invention, when the vehicle conventional cruise control module 26 is active, attempts to classify the relationship between the controlled vehicle and a sensed preceding vehicle (if available) into one of two modes, corresponding to two speed control strategies. Upon classification, the appropriate control strategy is executed, and an appropriate control command is issued such as a braking command to a brake control module 30, or as a revised cruise control set speed to the cruise control module 26. In this embodiment, the adaptive speed controller may be any conventional microprocessing unit, such as a Motorola MC68HC11 single chip micro-controller.

The type of control command issued corresponds to the level of control intervention necessary under the circumstances. For example, in mode 1, only subtle control of vehicle speed is necessary such that the desired vehicle speed may be attained by simply adjusting the cruise control set speed. The cruise control module may then control throttle position in a conventional manner, based on the adjusted desired speed. However, in mode 2, greater control authority is required to appropriately control vehicle speed, such that coasting or braking may be required.

An alarm indicator 28 is provided to apprise the driver of conditions that may require his intervention, such as a determined need for a deceleration value that exceeds a predetermined maximum deceleration value. However, the inventor contemplates that the driver may be apprised of less severe situations, such as a violation of the desired following distance or simply the detection of a preceding vehicle.

The cruise control module 26 is connected to the speed controller 18. The cruise control module communicates a driver set speed $V_{SET}$ to the controller, which is the driver's requested cruising speed, and a cruise enable signal, indicating whether cruise control is currently active. This request is within the driver's control, in that the driver may request cruise control, cancel that request, or temporarily suspend that request in a conventional manner, and thereby deactivate cruise, such that the routine incorporating the principles of this invention will not execute. For example, the driver may enable cruise by setting a switch located in proximity to the instrument panel. He may cancel cruise control by resetting that switch, or by interrupting power to the cruise system. Finally, he may temporarily suspend cruise by applying brakes, or by requesting a change in the set speed. In this embodiment, when conventional cruise has been disabled, adaptive speed control will also be inactive.

The adaptive speed control module 18, if active, transmits a set speed to the cruise control module. This speed will be the same as the driver set speed if there is no preceding vehicle present or if the desired speed determined by the adaptive speed control system in accord with this invention exceeds the driver set speed. Otherwise, the transmitted set speed will be some value less than the driver set speed.

The adaptive speed control module also sets a "brakes enabled" flag when braking is required in accord with this invention. The cruise control module 26 has access to this flag, and will disable cruise control when the flag shows the brakes to be enabled. When cruise is disabled in this manner, the throttle blade is automatically close or is allowed to close such that the brakes, which are presently trying to decelerate the vehicle, are not opposed by engine power, i.e. via a throttle that is not closed. When the system determines that brakes are no longer needed, the brakes enabled signal is deactivated, such that normal throttle control may resume.

Figure 3:
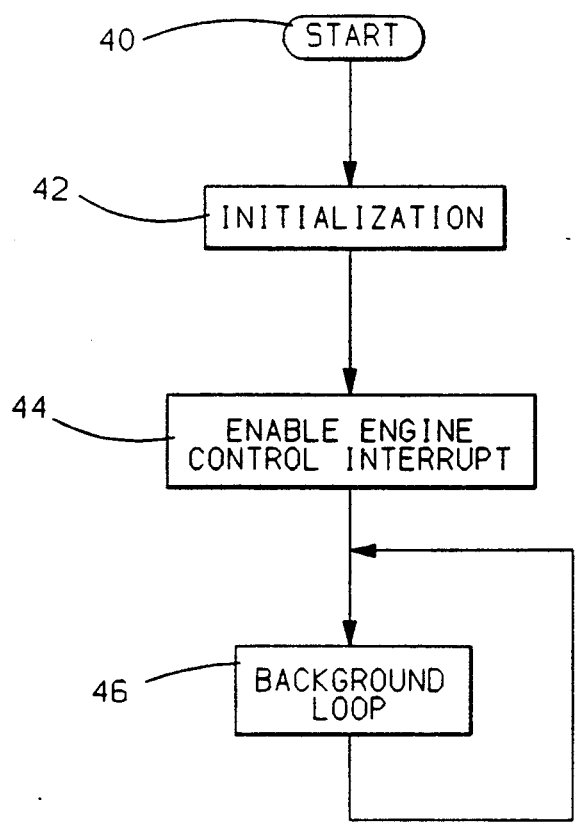
FIG. 3 through 6 and 8 are computer flow diagrams illustrating the steps carried out by the adaptive speed controller of FIG. 2.

Referring to FIG. 3, when power is applied to the system, such as when vehicle ignition is turned to its "on" position, the routine incorporating the principles of this invention starts at step 40, and proceeds to step 42 where the system is initialized. At this step data constants are loaded from ROM locations to RAM locations, and counters, pointers and flags are initialized. The routine then proceeds to step 44, where interrupts used in the operation of the routine incorporating the principles of this invention are enabled.

Next, the routine proceeds to a background loop at step 46, which is continuously repeated while the system is operating. In this loop, system maintenance and diagnostic routines may be executed. This loop is interrupted by the main routine used to carry out the principles of this invention, illustrated in FIG. 4. In this embodiment, this interrupt is programmed to occur every 125 milliseconds.

Figure 4A:
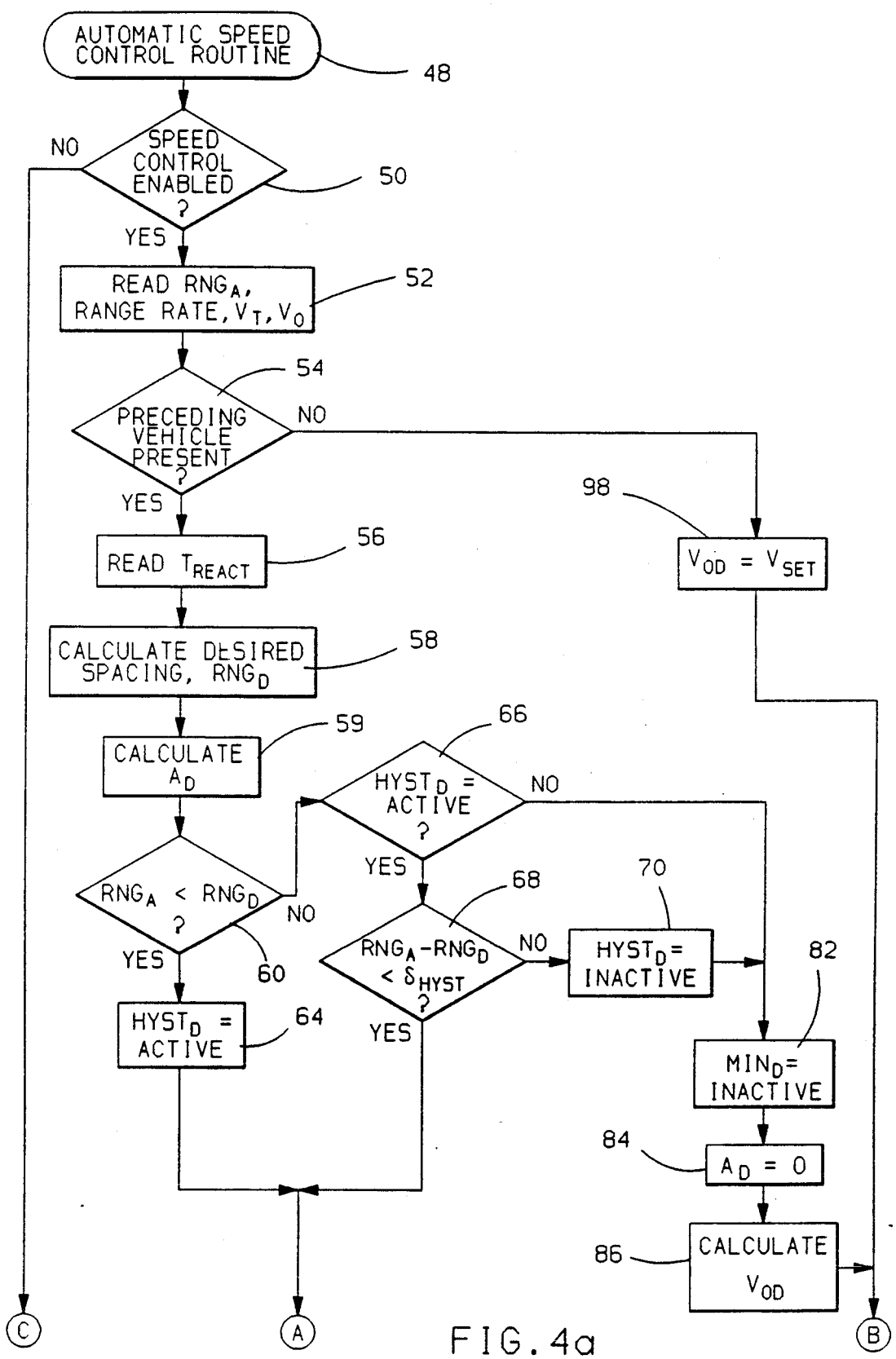
Figure 4B:
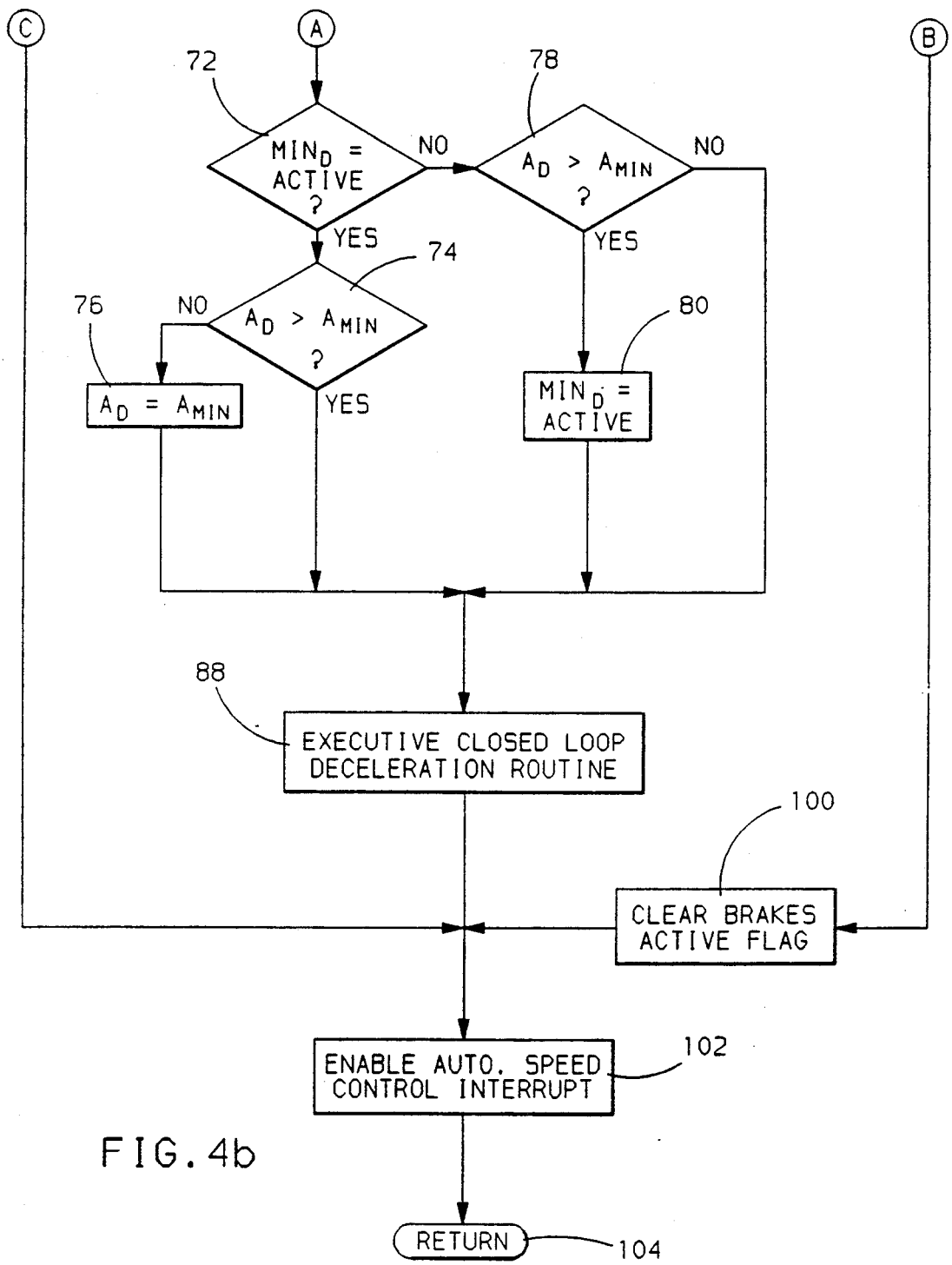

Referring to FIG. 4, the processor, on servicing the speed control interrupt in accord with this invention, proceeds to step 48. In general, this interrupt, if the vehicle operator has requested cruise control, examines vehicle operating conditions and the vehicle's relationship to a preceding vehicle, if available, and based on that examination, either determines a new vehicle set speed, which is communicated to a conventional cruise control module, or determines that braking is necessary, at which time cruise control is temporarily disabled, and a brake pressure command is transmitted to the conventional brake control module 26. The brake control module in this embodiment is a common vehicle traction controller. If no preceding vehicle is detected, the routine in this embodiment simply passes the operator set speed through to the cruise control module 26, for use in a conventional cruise control algorithm.

Specifically, the routine proceeds from step 48 to step 50, where a check is made to determine whether the operator has requested cruise control. If no such request has been made, or if, in a conventional manner the cruise has been disabled, for example by the operator applying the brakes, or by the operator turning off cruise control via the conventional cruise control set switch, the routine exits this routine through step 102, which simply resets the interrupt service routine, such that it will occur again at a predetermined time. After resetting the interrupt at step 102, the routine proceeds to step 104, where control is returned to the background loop of FIG. 3.

If, at step 50, it is determined that the operator has requested cruise control, the routine proceeds to step 52, where general parameters used in this invention are read and are stored in RAM. In this embodiment, these parameters are determined using the conventional obstacle detection system 20 of FIG. 2, which periodically sweeps a predetermined area ahead of the controlled vehicle for obstacles. The detection system provides the range of the detected vehicle $RNG_A$, the range rate, or the rate that range is changing with respect to a predetermined time base, and the velocity of the preceding vehicle $V_T$. Additionally, at this step the velocity of the controlled vehicle $V_o$ is read using the vehicle speed sensor 22 of FIG. 2, and is stored in RAM.

The routine then proceeds to step 54, to check for preceding vehicles. This check may be made by examining the range value received at step 52, such that if this value is excessively large, it is assumed that no preceding vehicle is currently present. A detected obstacle may be assumed to be a preceding vehicle. The characteristics of the preceding vehicle then become a factor with which the speed control of the controlled vehicle may be changed. Although this embodiment assumes a preceding obstacle may be a vehicle, the principles of this invention should be construed to apply to any detected obstacle in the path preceding the controlled vehicle.

If no preceding obstacle is detected, the routine proceeds to step 98, where the speed command $V_{OD}$ to be returned to the cruise control module upon completion of this routine is set to the original driver set speed, which is the speed the driver sets when cruise control is requested. Thus, this routine does not alter the driver set speed when no preceding obstacle is detected.

The routine then proceeds to step 100, where a brakes active flag is cleared. This flag is set whenever vehicle braking is required, and is periodically read by the cruise control module. The module will disable throttle when the flag is set, allowing the throttle to close before braking is initiated. In this manner, the potential for contention problems between brakes and throttle is reduced.

After the brakes active flag is cleared, the routine proceeds to step 102, where the interrupt used to trigger operation of this routine is enabled, as discussed. Finally, the routine returns to the background loop of FIG. 3, via step 104.

Returning to step 54, if a preceding vehicle is present, the routine then moves to step 56 and reads $T_{REACT}$ from system memory. $T_{REACT}$ is a predetermined driver reaction time which is used as a factor in determining a desired distance with which to follow a detected preceding vehicle.

The routine now has adequate information to calculate the desired following distance $RNG_D$, at step 58. $RNG_D$ is a function of the relative speed of the two vehicles, the range of the two vehicles, and of the range rate. Additionally, as discussed, $RNG_D$ is a function of $T_{REACT}$, a predetermined value indicating the driver reaction time. If the driver reaction time is small, a smaller following distance may be tolerated, whereas a larger reaction time will require a larger following distance.

Upon calculation of $RNG_D$, the routine proceeds to step 59, where a routine to calculate $A_D$ is executed. This routine generally attempts to determine the deceleration value necessary to decelerate the vehicle, once it is in the discussed mode 2 range, to a predetermined final condition. This routine may be executed while in mode 1 or mode 2, to predict whether conditions are such that when mode 2 is entered, the predetermined final condition can be met. In the case that the maximum allowable vehicle deceleration can not meet the final condition, an alarm will be activated to apprise the driver of the violation or of the prospective violation.

After executing the routine to calculate $A_D$, the actual range $RNG_A$ is compared to the desired range $RNG_D$ at step 60. If the $RNG_D$ has been violated, i.e. if $RNG_A$ is less than $RNG_D$, mode 2 is active, and the vehicle will be decelerated according to the value $A_D$, calculated in the routine executed at step 59. To carry out these steps, the routine moves to step 64, where a hysteresis active flag is set. The hysteresis active flag is set whenever the routine is in mode 2, such that a hysteresis factor $\delta_{HYST}$ will be added to the mode 2—mode 1 transition distance in a conventional manner to prevent control oscillations when $RNG_A$ is oscillating around $RNG_D$.

In general, this algorithm switches between mode 1 and mode 2 based on the difference between the actual inter-vehicle range $RNG_A$ and the desired inter-vehicle range $RNG_D$, as is illustrated in FIG. 1. By adding $\delta_{HYST}$ to the transition distance while in mode 2, the transition will not be made to mode 1 until the actual spacing exceeds the desired spacing plus $\delta_{HYST}$. Once in mode 1, the factor is not used, such that mode 2 will be entered on the normal transition point.

Returning to step 60, if $RNG_A$ is greater than or equal to $RNG_D$, the routine proceeds to step 66, where the hysteresis flag is checked. The difference between desired and actual range, examined at step 60, indicates that mode 1 may be active. However, if the routine was last in mode 2 such that distance hysteresis is active, an additional check must be made before entering mode 1. This check, at step 68, requires the difference between actual and desired range to exceed the hysteresis factor $\delta_{HYST}$, or in other words, the $RNG_A$ must exceed the sum of $RNG_D$ and $\delta_{HYST}$.

If actual range does exceed this sum, the routine clears the distance hysteresis active flag at step 70. Once this flag is cleared, or if hysteresis was not active at step 66, the routine proceeds to step 82, where a minimum deceleration function $MIN_D$ is deactivated. MIND is a function that limits the deceleration of the vehicle to a predetermined minimum, such as the level road coast rate, to reduce driver perception of the final stages of deceleration, as will be discussed. This function is used in mode 2 control when deceleration is carefully controlled, and therefore is deactivated here.

Next, the routine proceeds to step 84, where the desired deceleration value $A_D$ is cleared. This value is used as the commanded deceleration value in mode 2 only, and therefore is otherwise deactivated. A routine is then executed at step 86 to revise, if necessary, the desired vehicle traveling speed in accord with the detected preceding vehicle. It should be noted and will be detailed later that the determined revised speed will be limited to speed less than the driver set speed $V_{SET}$.

Upon completing the revised speed determination at step 86, the brakes active flag is cleared at step 100, as discussed. The routine then proceeds to step 102, where the interrupt used to trigger operation of this routine is re-enabled, as discussed. Next, the routine returns to the background loop of FIG. 3, via step 104.

Returning to step 68, if the actual range $RNG_A$ does not exceed the sum of the desired range $RNG_D$ and the hysteresis factor $\delta_{HYST}$, or if the routine just executed steps 60 and 64, the routine proceeds to step 72, where the minimum deceleration function active flag $MIN_D$ is checked. $MIN_D$ is activated whenever a deceleration value $A_D$ is calculated that exceeds a predetermined minimum value $A_{MIN}$, such that $A_D$ will then be limited by the lower limit $A_{MIN}$. In general, the vehicle will be decelerated at $A_D$, which will continue to decrease in magnitude as $V_o$ approaches $V_T$, according to the discussed objectives of mode 2 control, until $A_D$ equals or is less than $A_{MIN}$. The vehicle deceleration will then remain at $A_{MIN}$ until the actual range of the vehicles approximately equals the desired range of the vehicles.

In this embodiment, $A_{MIN}$ is the predetermined level road coast rate of the vehicle, which may be determined off-line in a vehicle calibration process. The level road coast rate of the vehicle is a desirable deceleration value in the context of this invention, as it has been determined to be a deceleration value that is relatively innocuous to the driver in relation to other deceleration values.

Specifically, at step 72, if $MIN_D$ is active, the routine proceeds to step 74, where $A_D$ is compared to $A_{MIN}$. $A_D$ is limited to $A_{MIN}$ at step 76 if it is below $A_{MIN}$. After checking this limit at step 74, and if necessary, after limiting $A_D$ at step 76, the routine proceeds to step 88, where a closed loop deceleration routine is executed. This deceleration routine attempts, using vehicle brakes, to drive actual deceleration rate $A_o$ to the desired deceleration rate $A_D$. After executing this routine, the speed control interrupt that initiates the routine of FIG. 4 is enabled at step 102. The routine then returns to the background loop of FIG. 3 via step 104, as discussed.

Returning to step 72, if the minimum deceleration function $MIN_D$ is not active, the routine proceeds to step 78, where $A_D$ is compared to the minimum deceleration value $A_{MIN}$. If $A_D$ exceeds $A_{MIN}$, the minimum deceleration function is activated at step 80, such that $A_D$ will, in prospective iterations of this routine, be limited to values greater than or equal to $A_{MIN}$. The routine then proceeds to step 88, where the closed loop deceleration control routine is executed, as discussed.

If, at step 78, $A_D$ is already less than or equal to $A_{MIN}$, the minimum deceleration function is not enabled, and the routine proceeds to step 88 directly. In this case the vehicle is being controlled according to relatively subtle deceleration values, i.e. values lower than $A_{MIN}$, such that it is not considered desirable to limit deceleration to the higher $A_{MIN}$ value.

Figure 5:
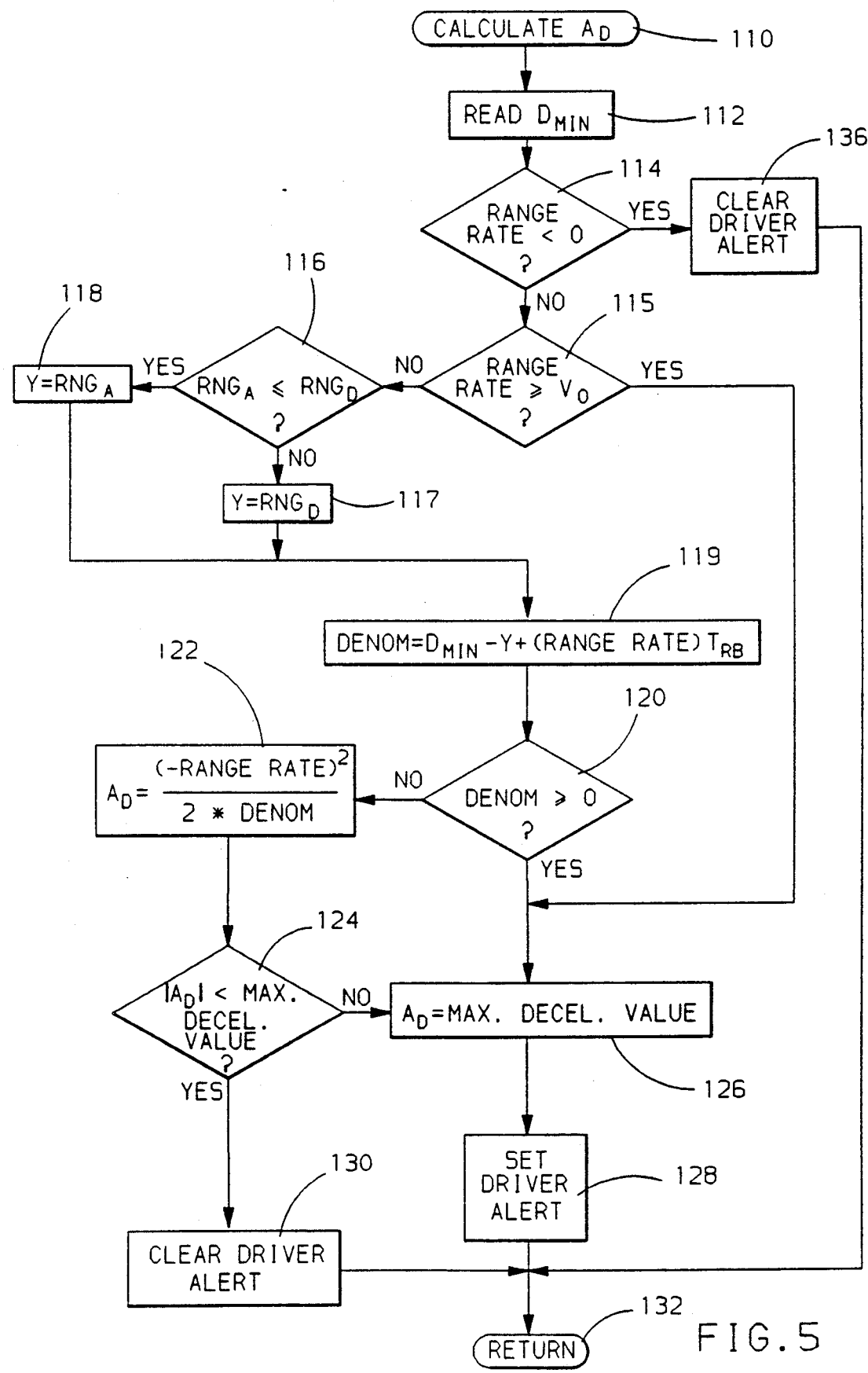

The specific steps required to calculate $A_D$, called from step 59 of the main speed control routine illustrated in FIG. 4, is illustrated in FIG. 5, and is entered at step 110. This routine iteratively calculates $A_D$, subject to the final condition that when $A_D$ is substantially zero, $RNG_A$ will be approximately equal to a predetermined minimum range $D_{MIN}$ pre-set by the driver, and $V_o$ and $V_T$ will substantially be the same.

Figure 7:
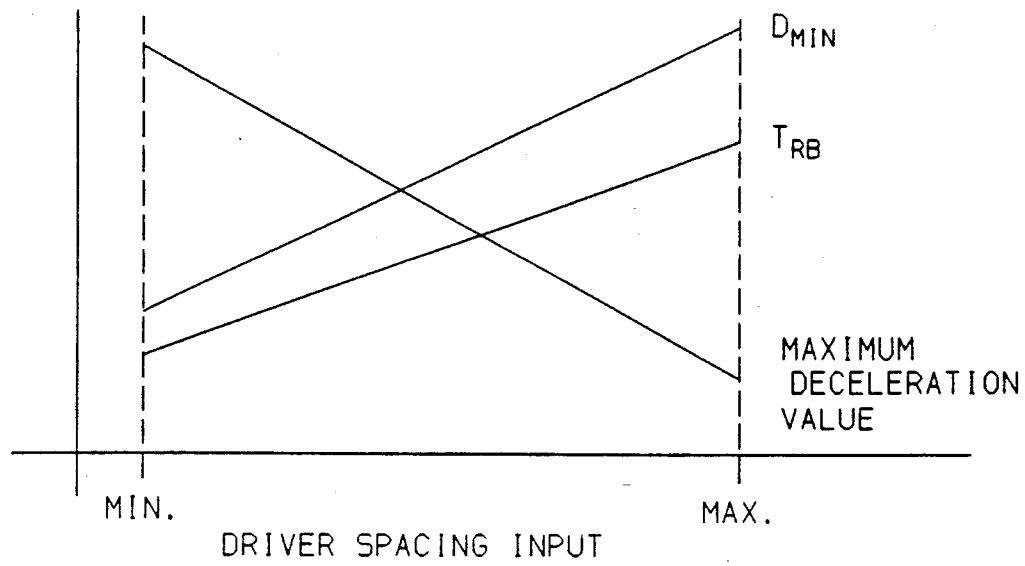
FIG. 7 is a diagram illustrating the basic relationship between the driver's spacing input and the minimum following distance, braking reaction time, and maximum allowable deceleration value.

Specifically, the routine proceeds from step 110 to step 112, where $D_{MIN}$ is read. In accord with the principles of this invention, the driver may, according to his preferred driving style, set a "spacing input", illustrated in FIG. 7. This input may be set by the driver using a conventional dial in proximity to the instrument panel of the vehicle. The dial set position (the driver spacing input) is directly proportional to $D_{MIN}$, and to a braking reaction time $T_{RB}$, and is inversely proportional to a maximum deceleration value.

After reading $D_{MIN}$ from the spacing input, the routine proceeds to step 114, where the range rate, or the rate at which $RNG_A$ is changing is examined. If it is less than zero, meaning that the controlled vehicle is moving away from the preceding vehicle, there is no need to calculate $A_D$, which is only used when the controlled vehicle is closing on the preceding vehicle.

Accordingly, if range rate is less than zero, the routine proceeds to step 136, where any previously set driver alerts are cleared. The driver alert may be an audible or a visual indication to the driver that a situation exists or is developing that warrants the driver's attention, such as a violation, or a potential violation of the maximum allowable deceleration. After clearing any active alerts at step 136, the routine proceeds to step 132, where it returns to step 59 of the routine illustrated in FIG. 4.

Returning to step 114, if the range rate is greater than or equal to zero, the routine proceeds to step 115, where the range rate is compared to the present vehicle velocity $V_o$. In this embodiment, if range rate exceeds or is equal to $V_o$, it is determined that the deceleration required to meet the final conditions of mode 2 may violate the maximum allowable deceleration value.

In such a case, the desired deceleration value is set to the maximum available value at step 126, and the routine proceeds to step 128, where the driver is alerted of the potential violation. This alert may include an aural and visual warning in a conventional manner, for example illuminating a warning light in proximity to the instrument panel, and activating an aural tone of substantial amplitude to apprise the driver of its presence. The routine then, at step 132, returns to step 59 of the routine illustrated in FIG. 4.

Alternatively if, at step 115, the range rate is less than $V_o$, the routine moves to step 116, where the actual range $RNG_A$ is compared to the desired range $RNG_D$. Steps 116 through 118 make a substitution necessary to allow calculation of $A_D$ in the mode 1 range or in the mode 2 range. If in mode 1, these steps substitute $RNG_D$ into the equation for calculation of the desired deceleration value $A_D$. $RNG_D$ is required for the deceleration value calculation while in mode 1 because $RNG_D$ is the range at which the vehicle deceleration will start to be controlled according to $A_D$. The value of $A_D$, once calculated using $RNG_D$ in this manner, can be checked against the system limits to verify that the final conditions will not be violated. If they will be violated, an alarm is activated, apprising the driver of the prospective violation.

However, if operating in mode 2, the actual range of the controlled vehicle will be used in the $A_D$ calculation, as it is at that range that control according to $A_D$ will be attempted. Accordingly, if the calculated value of $A_D$ necessary to meet the predetermined final conditions exceeds the maximum allowable deceleration, an alarm is activated.

Specifically, at step 116, if $RNG_A$ is greater than $RNG_D$, indicating that mode 1 may be active, the routine proceeds to step 117 and sets a dummy variable Y to $RNG_D$, such that $RNG_D$ will be used in the calculation of $A_D$. Alternatively, at step 116, if $RNG_A$ is less than or equal to $RNG_D$, indicating that mode 2 is active, the routine proceeds to step 118, where Y is set to $RNG_A$, such that $RNG_A$ will be used in the calculation of $A_D$.

After determining the value to be assigned to Y via steps 116 through 118, the routine proceeds to step 119, to determine the denominator DENOM of the expression used to calculate $A_D$, according to the following expression $$DENOM = D_{MIN} - Y + (\text{Range Rate}) * T_{RB}$$

where $T_{RB}$ is the driver influenced brake reaction time, and $D_{MIN}$ is the driver influenced minimum allowable range. The driver influences both of these parameters via the driver spacing input.

$T_{RB}$ is a setting pertaining to the desired responsiveness of the vehicle braking system. It is directly proportional to the driver spacing input, such that the higher the spacing input, the larger the braking reaction time in response to a determined need for braking. In this manner, a driver may influence how quickly his brakes react in situations requiring automatic braking.

Next, at step 120, DENOM is compared to zero. The denominator provides information concerning the capability of the system to decelerate the vehicle so as to satisfy the predetermined final conditions. This may be seen by rearranging the inequality illustrated in step 120 as follows $$Y < = D_{MIN} + (\text{Range Rate}) * T_{RB}$$

This inequality, if it holds, illustrates that, in the context of the driver programmed braking reaction time $T_{RB}$, and with the present difference in speed between the vehicles, the actual range of the vehicle will violate $D_{MIN}$, despite the largest available deceleration value. In this case, the driver must be notified of the potential violation.

Accordingly, if DENOM is greater than or equal to zero, the routine proceeds to step 126, where the desired deceleration value $A_D$ is set to the maximum deceleration value. The routine then proceeds to step 128, where the driver is apprised of an alert condition by a conventional alert means, as discussed. The routine then proceeds to step 132, where it returns to step 59 of the routine illustrated in FIG. 4.

Returning to step 120, if DENOM is less than zero, a deceleration value may be available such that the controlled vehicle can be decelerated to a speed which is less than or equal to the preceding vehicle speed before a violation of $D_{MIN}$ occurs. Accordingly, the routine proceeds to step 122, where the deceleration value $A_D$ is calculated according to the following equation $$A_D = (-\text{RANGE RATE})^2 / (2 * DENOM)$$

This deceleration value is based on boundary conditions largely controlled by the driver, via the discussed "spacing input". With that input the driver influences the minimum following distance, braking reaction time, and maximum deceleration value in a manner consistent with his preferred driving style.

Generally, the constraints within which $A_D$ is calculated are the desire to not violate $D_{MIN}$, tempered with the braking reaction time and the maximum deceleration value. Accordingly, $A_D$ is calculated according to the equation illustrated at step 122 such that when $RNG_A$ is substantially equal to $D_{MIN}$, the velocity of the two cars will be approximately the same, such that the controlled vehicle is no longer closing on the preceding vehicle. Additionally, $A_D$ is limited by a driver influenced maximum deceleration value, to ensure a deceleration value is not imposed on the vehicle that the driver is not comfortable with.

Once the vehicle deceleration $A_D$ is reduced to a value less than or equal to a predetermined minimum deceleration value $A_{MIN}$, assuming $A_D$ started at a magnitude above $A_{MIN}$, it is maintained at $A_{MIN}$ until $RNG_A$ is substantially equal to $RNG_D$.

Specifically, upon calculating $A_D$ at step 122, the routine proceeds to step 124, where the absolute value of $A_D$ is compared to the driver influenced maximum deceleration value. If $A_D$ exceeds this maximum, it is limited to the maximum value at step 126. The routine then proceeds to step 128, where the driver is apprised of the violation of the maximum deceleration value via the discussed aural and visual alerts. The routine then proceeds to step 132, where it returns to step 59 of the routine illustrated in FIG. 4.

Alternatively, if the absolute value of $A_D$ does not exceeds the maximum allowed deceleration value at step 124, the routine proceeds to step 130, where any previous driver alerts are cleared. The clearing of the alert indicates that the predetermined final condition may be satisfied without violating the maximum deceleration value. Next, the routine proceeds to step 132, where it returns to step 59 of the routine illustrated in FIG. 4.

Figure 6:
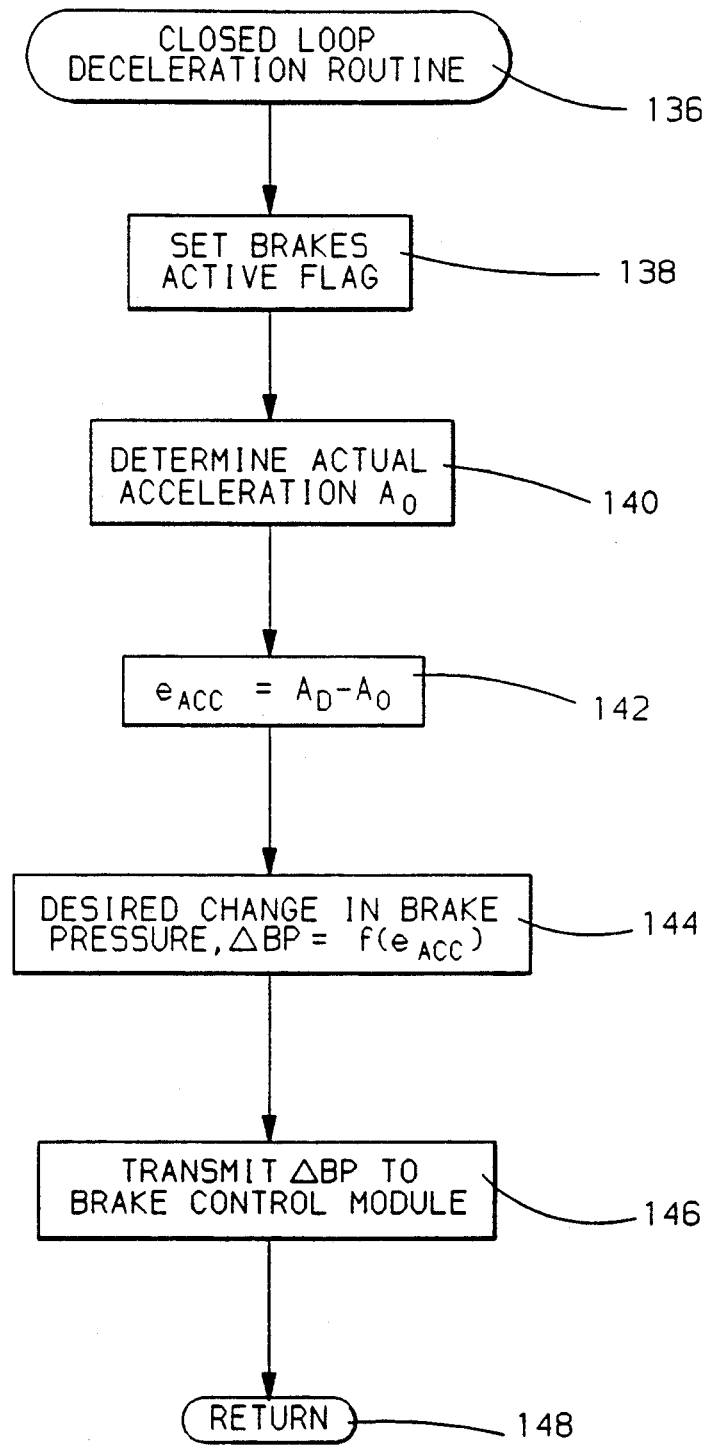

The specific closed loop deceleration control routine called by step 88 of the routine illustrated in FIG. 4, is depicted in FIG. 6, and starts at step 136. The routine proceeds to step 138, where the brakes active flag is set, indicating that braking will be required to achieve the desired deceleration. Next, the routine proceeds to step 140, where the present deceleration of the controlled vehicle $A_o$ is determined. This value may be determined using a conventional vehicle speed signal, calculating the rate that signal changes over a predetermined time period.

Next, at step 142, the deceleration error $e_{ACC}$ is generated as the simple difference between $A_D$ and $A_o$. The routine then moves to step 144, where a desired change in brake pressure $\Delta BP$ is calculated as a function proportional to $e_{ACC}$. $\Delta BP$ is determined as the change in brake pressure necessary to reduce the difference between $A_D$ and $A_o$ substantially to zero in an expedient manner.

This pressure change is then, at step 146, transmitted to a conventional brake control module, such as a traction controller. The brake control module generally adds $\Delta BP$ to or, in the appropriate case, subtracts $\Delta BP$ from any existing commanded brake pressure, thus altering vehicle deceleration in a manner consistent with reaching the desired deceleration value $A_D$. The iterative nature of the routine incorporating the principles of this invention, by repeatedly revising $\Delta BP$ such that $A_o$ approaches $A_D$, provides a means of closed loop deceleration control based on $A_D$.

After communicating the change in brake pressure to the brake control module, the routine proceeds to step 148, where the routine returns to step 102 of the routine illustrated in FIG. 4.

In this embodiment, the closed loop deceleration routine illustrated in FIG. 6 may be executed in a manner other than via step 88 of the routine illustrated in FIG. 4. A dedicated processor interrupt is used in this embodiment to initiate the closed loop deceleration routine at an execution rate exceeding the 125 millisecond execution rate of the routine of FIG. 4. Specifically, in this embodiment the routine of FIG. 6 is executed twice by the dedicated interrupt for every one time it is executed by the routine call from step 88 of FIG. 4. In this manner, for a calculated value of $A_D$, several deceleration iterations in accord with the routine of FIG. 6 may be executed in an attempt to eliminate deceleration error $e_{ACC}$. By increasing the iteration rate of the routine of FIG. 6, the smoothness and overall responsiveness of the braking control is improved, in accord with a general purpose of this algorithm—to control vehicle speed in an unobtrusive manner.

Figure 8:
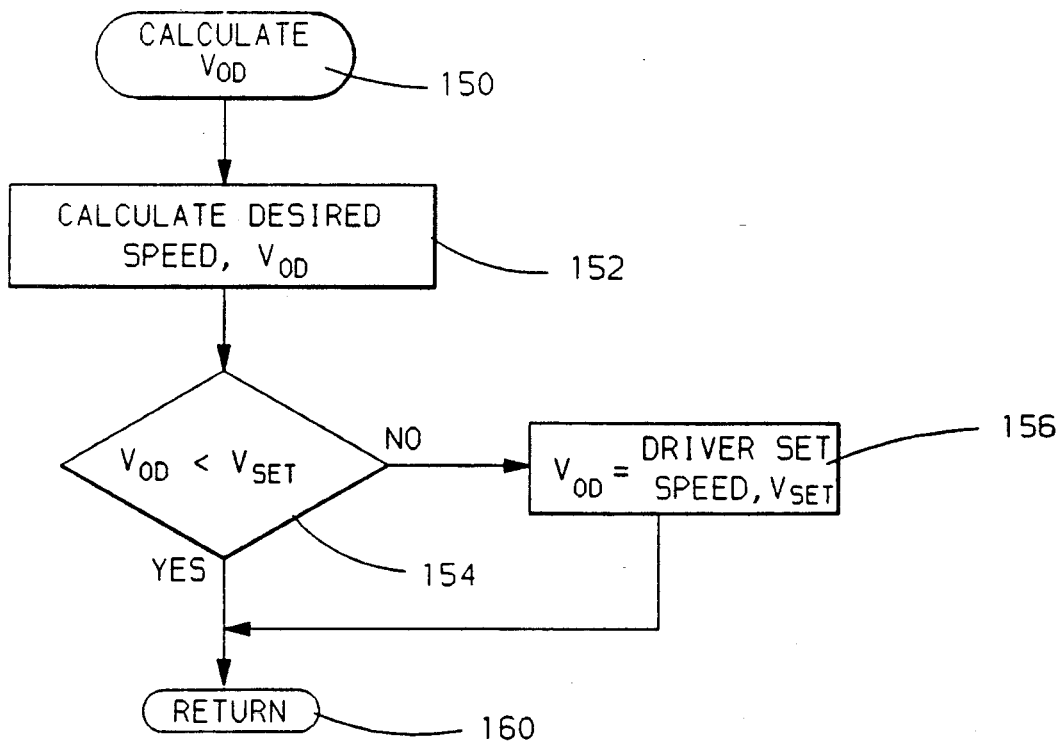

Returning to step 86 of the routine illustrated in FIG. 4, if the routine is in mode 1, i.e. if the actual range exceeds the desired range of the vehicles, it is necessary to determine a desired traveling speed for the controlled vehicle. This determination takes place in the routine called from step 86 of the routine illustrated in FIG. 4, and starts at step 150 of the routine illustrated in FIG. 8.

The routine proceeds to step 152, where the desired vehicle speed $V_{OD}$ is ascertained. $V_{OD}$ may be determined in any conventional manner, for example by basing the controlled vehicle speed on the periodically updated sensed speed of the lead vehicle. However, the inventor contemplates this determination as including any means of providing a speed that minimizes the magnitude of the difference between desired range and actual range, in a manner that places high importance on minimizing the obtrusiveness of the speed control.

Upon calculation of $V_{OD}$, the routine proceeds to step 154, where is compared to the cruise control set speed $V_{SET}$, as set by the driver upon activating cruise control, as discussed. Understanding that the driver alone can increase the traveling speed of his vehicle above his original set speed, and that the routine incorporating the principles of this invention simply deals with situations that inquire as to whether the vehicle speed may be reduced below the driver's set speed, $V_{OD}$ will be limited to values below the driver's set speed.

Accordingly, if $V_{OD}$ exceeds $V_{SET}$ at step 154, it will be limited to $V_{SET}$ at step 156. The routine then, via step 160, returns to step 100 of the routine illustrated in FIG. 4. Alternatively, if $V_{OD}$ does not exceed $V_{SET}$, the routine proceeds from step 154 to step 160 directly, after which it returns to step 100 of the routine illustrated in FIG. 4. The cruise control, upon receiving $V_{OD}$, may control vehicle speed according to $V_{OD}$ in any conventional manner.

The foregoing description of a preferred embodiment for the purpose of describing the invention is not to be considered as limiting or restricting the invention since many modifications may be made by the exercise of skill in the art without departing from the scope of the invention.

The embodiments of this invention in which an exclusive property or privilege is claimed, are as follows:

1. A method for automatically controlling the traveling speed of a controlled automotive vehicle, comprising the steps of:

sensing the presence of a preceding vehicle in the path of said controlled vehicle;

controlling the traveling speed of said controlled vehicle according to a first speed control method in the absence of a preceding vehicle in the path of said controlled vehicle, said first speed control method comprising the steps of (a) sensing a driver set speed set by the driver as the desired traveling speed of the controlled vehicle, and (b) controlling the traveling speed of the controlled vehicle so as to minimize the difference between said driver set speed and said actual traveling speed of said controlled vehicle;

sensing the actual spacing between said controlled vehicle and said preceding vehicle when said preceding vehicle is present;

ascertaining a desired spacing between said controlled vehicle and said preceding vehicle when said preceding vehicle is present;

reading a predetermined minimum allowable spacing which is less than said desired spacing;

controlling the traveling speed of said controlled vehicle according to a second speed control method when said actual spacing exceeds said desired spacing, to control an approach of the controlled vehicle to a predetermined one of the group consisting of the desired spacing and the minimum allowable spacing;

controlling the traveling speed of said controlled vehicle according to a third speed control method when said actual spacing is less than said desired spacing, to control an approach to and retreat from the minimum allowable spacing that will minimize the magnitude of changes in traveling speed and deceleration of the controlled vehicle, said third speed control method comprising the steps of (a) calculating a vehicle deceleration value with which to decelerate said controlled vehicle, said deceleration value being calculated such that as said actual spacing approaches said minimum allowable spacing, said traveling speed of said controlled vehicle approaches said traveling speed of said preceding vehicle, and said calculated deceleration value approaches zero, (b) decelerating said controlled vehicle according to said calculated deceleration value, (c) further decelerating said controlled vehicle at a predetermined deceleration value when said calculated deceleration value decreases to a value less than or equal to said predetermined deceleration value and (d) maintaining said controlled vehicle deceleration at said predetermined deceleration value until said actual range exceeds said desired range.

2. The automatic speed control method of claim 1, said step of controlling vehicle speed according to the second speed control method further comprising the steps of:

determining a desired traveling speed of said vehicle based on said traveling speed of said preceding vehicle and on said desired spacing, and (b) controlling the traveling speed of said controlled vehicle so as to minimize the difference between said desired traveling speed and said actual speed of said controlled vehicle when said desired traveling speed is less than said driver set speed.

3. The automatic speed control method of claim 1, said step of reading a predetermined minimum allowable spacing further comprising the steps of:

reading a driver spacing input indicative of a driver's preferred driving style;

ascertaining said predetermined minimum allowable spacing based on said driver spacing input.

4. The automatic speed control method of claim 1, said step of controlling vehicle speed according to a second speed control method further comprising the steps of:

determining a prospective deceleration value with which, when said actual range is less then said desired range, said controlled vehicle must be decelerated such that as said traveling speed of said controlled vehicle approaches said traveling speed of said preceding vehicle, said actual range approaches said minimum allowable distance;

reading a driver spacing input indicative of a driver's preferred driving style;

ascertaining a maximum tolerable vehicle deceleration value based on said driver spacing input;

comparing said prospective deceleration value to said maximum tolerable vehicle deceleration value;

indicating an alert condition corresponding to a prospective violation of the maximum tolerable deceleration value when said prospective deceleration value exceeds said maximum tolerable vehicle deceleration value.

5. The automatic speed control method of claim 1, said step of controlling vehicle speed according to a third speed control method further comprising the steps of:

reading a driver spacing input indicative of a driver's preferred driving style;

ascertaining a maximum tolerable vehicle deceleration value based on said driver spacing input;

comparing said calculated deceleration value to said maximum tolerable vehicle deceleration value;

limiting said deceleration of said controlled vehicle to said maximum tolerable vehicle deceleration value when said calculated deceleration value exceeds said maximum tolerable deceleration value;

indicating an alert condition corresponding to a violation of the maximum tolerable deceleration value when said calculated deceleration value exceeds said maximum tolerable vehicle deceleration value.

6. The automatic speed control method of claim 1, said step of controlling vehicle speed according to a third speed control method further comprising the steps of:

reading a driver spacing input indicative of a driver's preferred driving style;

ascertaining a desired brake system reaction time based on said driver spacing input;

adjusting said calculated deceleration value according to said desired brake system reaction time.

7. A method for automatically controlling the traveling speed of a controlled automotive vehicle, comprising the steps of:

sensing the presence of a preceding obstacle;

sensing the actual range between the controlled vehicle and the obstacle;

sensing the relative speed between the controlled vehicle and the obstacle;

decelerating the controlled vehicle according to a first speed control method when the actual range exceeds a predetermined desired range, to control an approach to the desired range that will minimize the magnitude of changes in speed and deceleration of the controlled vehicle, the first speed control method decelerating the controlled vehicle in such a manner that as the actual range approaches the desired range, the relative speed between the controlled vehicle and the obstacle approaches zero and the deceleration of the controlled vehicle approaches zero; and decelerating the controlled vehicle according to a second speed control method when the actual range is less than the predetermined desired range, to control an approach to and retreat from a predetermined minimum allowable spacing that will minimize the magnitude of changes in traveling speed and deceleration of the controlled vehicle, the second control method comprising the steps of (a) calculating a vehicle deceleration value with which to decelerate said controlled vehicle, said deceleration value being calculated such that as said actual spacing approaches the predetermined minimum allowable spacing, the relative speed between said controlled vehicle and the obstacle approaches zero, and said calculated deceleration value approaches zero; (b) decelerating said controlled vehicle according to said calculated deceleration value, (c) further decelerating said controlled vehicle at a predetermined deceleration value when said calculated deceleration value decreases to a value less than or equal to said predetermined deceleration value, and (d) maintaining said controlled vehicle deceleration at said predetermined deceleration value until said actual range exceeds said desired range.

* * * * *